United States Patent [19]

Numano et al.

[11] 4,424,616
[45] Jan. 10, 1984

[54] CONDITIONING LINE FOR STEEL PIPES

[75] Inventors: Masachika Numano, Yokosuka; Shinji Akita, Yokohama; Minoru Morita, Kawasaki, all of Japan

[73] Assignee: Nippon Kokan Kabushiki Kaisha, Tokyo, Japan

[21] Appl. No.: 291,955

[22] Filed: Aug. 11, 1981

[30] Foreign Application Priority Data

Aug. 20, 1980 [JP] Japan .................... 55-116727

[51] Int. Cl.³ .................................. B23P 23/06
[52] U.S. Cl. ........................ 29/33 T; 29/33 P; 29/563; 408/2; 409/133
[58] Field of Search .......... 29/33 T, 33 P, 563, 29/564; 228/9; 209/517, 518, 521; 73/45.1, 49.1, 49.5; 409/133; 408/2; 414/22; 83/79, 358; 144/356, 357; 198/346, 434

[56] References Cited

U.S. PATENT DOCUMENTS

| 2,902,139 | 9/1959 | Brenk et al. | 29/33 P |
| 2,979,196 | 4/1961 | Harmon | 209/518 X |
| 2,983,137 | 5/1961 | Lombard | 73/49.1 |
| 3,263,809 | 8/1966 | Mandula, Jr. et al. | 209/518 |
| 3,456,700 | 7/1969 | Ahlstedt | 144/1 R |
| 3,459,246 | 8/1969 | Ottosson | 144/356 |
| 3,530,571 | 9/1970 | Perr et al. | 29/563 X |
| 3,543,392 | 12/1970 | Perry et al. | 29/564 |
| 3,576,540 | 4/1971 | Fair et al. | 29/563 |
| 3,952,388 | 4/1976 | Hasegana | 29/563 X |
| 4,069,851 | 1/1978 | Bibler | 144/3 R X |

FOREIGN PATENT DOCUMENTS

| 54-117995 | 9/1979 | Japan | 29/337 |
| 197709 | 9/1977 | U.S.S.R. | 198/346 |
| 589576 | 1/1978 | U.S.S.R. | 209/518 |
| 753573 | 8/1980 | U.S.S.R. | 29/564 |

Primary Examiner—William R. Briggs
Attorney, Agent, or Firm—Fleit, Jacobson, Cohn & Price

[57] ABSTRACT

A conditioning line for steel pipes in which steel pipes are transversely transferred to effect the end processing thread cutting, thread inspection, hydrostatic testing, etc., on the steel pipes. With a view to increasing the efficiency of the conditioning operations, a reprocessing line is arranged to run parallel to a main line such that the steel pipes rejected on the main line are automatically transferred to the reprocessing line where the rejected steel pipes are reprocessed and automatically transferred back to the main line.

10 Claims, 4 Drawing Figures

CONDITIONING LINE FOR STEEL PIPES

BACKGROUND OF THE INVENTION

The present invention relates to the production and processing lines of steel pipes and more particularly a novel arrangement of the so-called conditioning line in which such operations as end facing, internal cleaning, end threading, thread inspection, hydrostatic testing, etc., are performed.

In the past, it has been the practice so that if a steel pipe is rejected for example as a result of the thread inspection in the course of the conditioning operations so as to be reprocessed (or refinished), the reprocessing of the steel pipe to be reprocessed is effected by transferring it by a crane or the like to the position of a reprocessing machine which is remote from the conditioning line. As a result, it has been practically impossible to transfer the reprocessed steel pipe back to the conditioning line due to a large time lag (the transfer and reprocessing of the pipe require 20 to 30 minutes) and the next steel pipe being processed on the conditioning line. For this reason, it has been necessary to effect the operations subsequent to the reprocessing operation (e.g., the hydrostatic testing, marking and coating) on a separate line with the resulting considerable deterioration of the operating efficiency.

SUMMARY OF THE INVENTION

It is the object of the present invention to provide an improved conditioning line so arranged that a steel pipe rejected as a result of inspection is automatically transferred to a reprocessing line arranged to extend parallel to the conditioning line where the steel pipe is reprocessed in a short period of time and then transferred back to the conditioning line, thus ensuring an improved conditioning efficiency.

Other and further objects, features and advantages of the invention will be apparent more fully from the following description.

DESCRIPTION OF THE PREFERRED EMBODIMENTS

Figure 1:
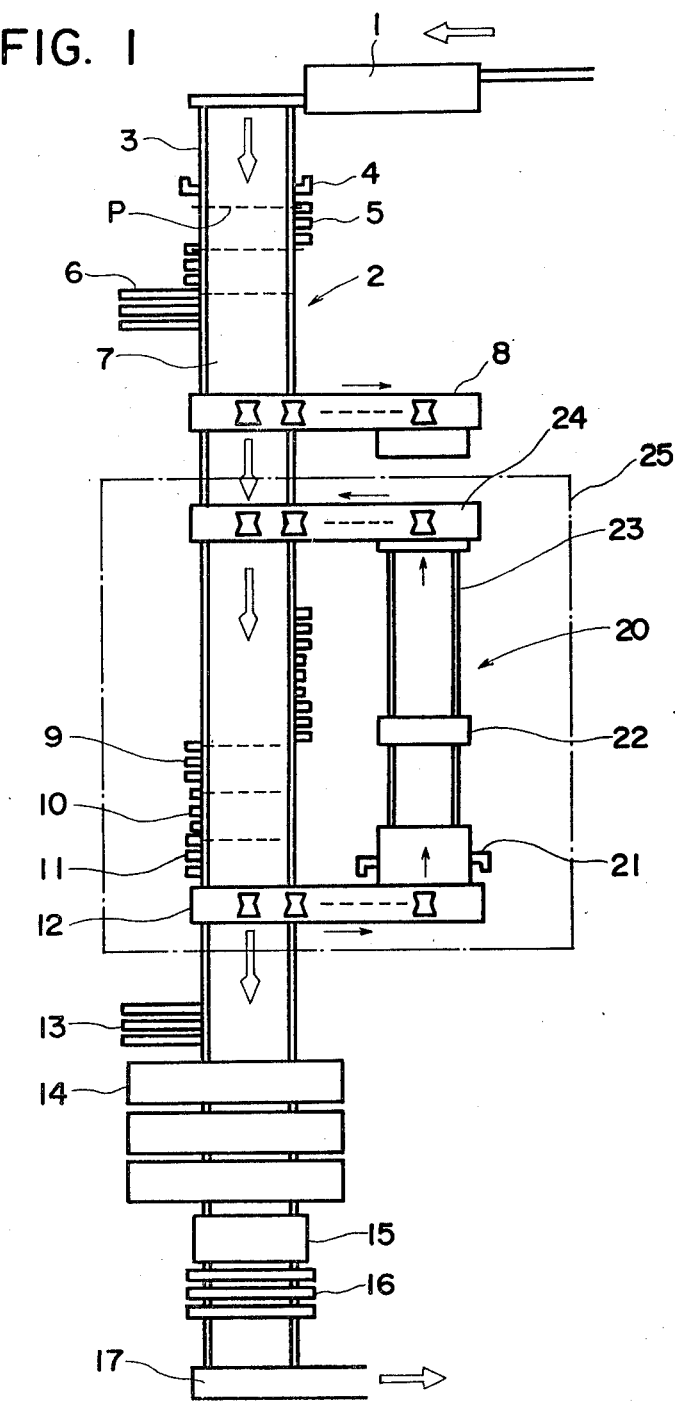
FIG. 1 is a plan view showing an embodiment of the arrangement of a conditioning line according to the present invention.

Referring to FIG. 1 showing an embodiment of the arrangement of a conditioning line according to the present invention, numeral 1 designates a cutting machine such that a steel pipe having a length of about 30 m and subject to the heat treatment, straightening, etc., after the pipe manufacturing operation, is fed lengthwise into the cutting machine 1 and is cut to length (e.g., 5 to 15 m). Numeral 2 designates a main line of a conditioning line, and 3 a transfer unit such as a walking beam or chain conveyor. Steel pipes P are successively fed transversely to the transfer unit 3 fed to test piece cutters 4 so that the pipe ends or the like are cut suitably, and then fed to end facing machines 5 which face the pipe ends. If necessary, the ends of the steel pipes P are tapered to facilitate the threading operation. The inner pipe surface of the end-faced steel pipes P are then cleaned by inner surface cleaners 6. Numeral 7 designates a test table where the steel pipes are inspected for outer surface defects, deformation, etc., by the visual inspection or the like so that if any steel pipe is rejected as a result of the inspection, it is impossible to reprocess the steel pipe and it is taken out of the main line by a kickout mechanism or unit 8. The kickout mechanism 8 comprises for example a large number of drum rolls arranged in a direction perpendicular to the transfer unit 3, so that when any rejected steel pipe arrives at a position just above the kickout mechanism 8, the steel pipe is detected, pushed upward by the rolls from below the transfer unit 3 and then automatically delivered to the outside of the main line 2 by the rolls.

The large part of the steel pipes accepted as a result of the inspection, is further transferred along the main line 2 so that their ends are threaded by threading machines 9 and the threaded ends are then inspected by thread inspection units 10. The greater part of the steel pipes pass the inspection, so that couplings, protectors, etc., are fitted on their threaded ends by fittings mounting units 11 and the steel pipes are successively delivered to the following operations. The rejected products forming a very small part of the steel pipes (1 to 2% or less) are detected at the stage of the fittings mounting units 11 so that the rejected steel pipes pass the units 11 without being fitted with any fittings and they are then transferred by a kickout unit 12 to a reprocessing line 20 which will be described later.

The large part of the steel pipes P which was accepted by the thread inspection is delivered to a screwing unit 13 which tightens the couplings, etc., fitted on the ends of the steel pipes and they are then subjected to hydrostatic testing by a hydrostatic testing unit 14. Then, the accepted steel pipes P are shipped via a counter wheel/basis weight measurer 15, a marking unit 16, a coating unit 17, etc.

On the other hand, the few steel pipes rejected as a result of the thread inspection are delivered by the kickout unit 12 to the reprocessing line 20 so that the threaded ends of the steel pipes are cut off by a multiple-function reprocessing unit 21 and then they are subjected to the end facing, tapering, if necessary, and inner surface cleaning. The steel pipes are then transferred in the direction of the arrow by a high-speed transfer unit comprising a carriage 22 which is movable at a high speed and rails 23 and the steel pipes are placed on a kickin unit 24. The knockin unit 24 is constructed to operated in the manner reverse to the kickout units 8 and 12 so that when there is a vacancy, the portion of the kickin unit 24 on the main line side is lowered and the steel pipes are transferred to the main line 2. As a result, the reprocessed steel pipes are again subjected to the threading operation as well as the subsequent processing operations and testing and they are then delivered to the shipping side. The kickout unit 12 and the kickin unit 24 respectively comprise large number of drum rolls.

Figure 2:
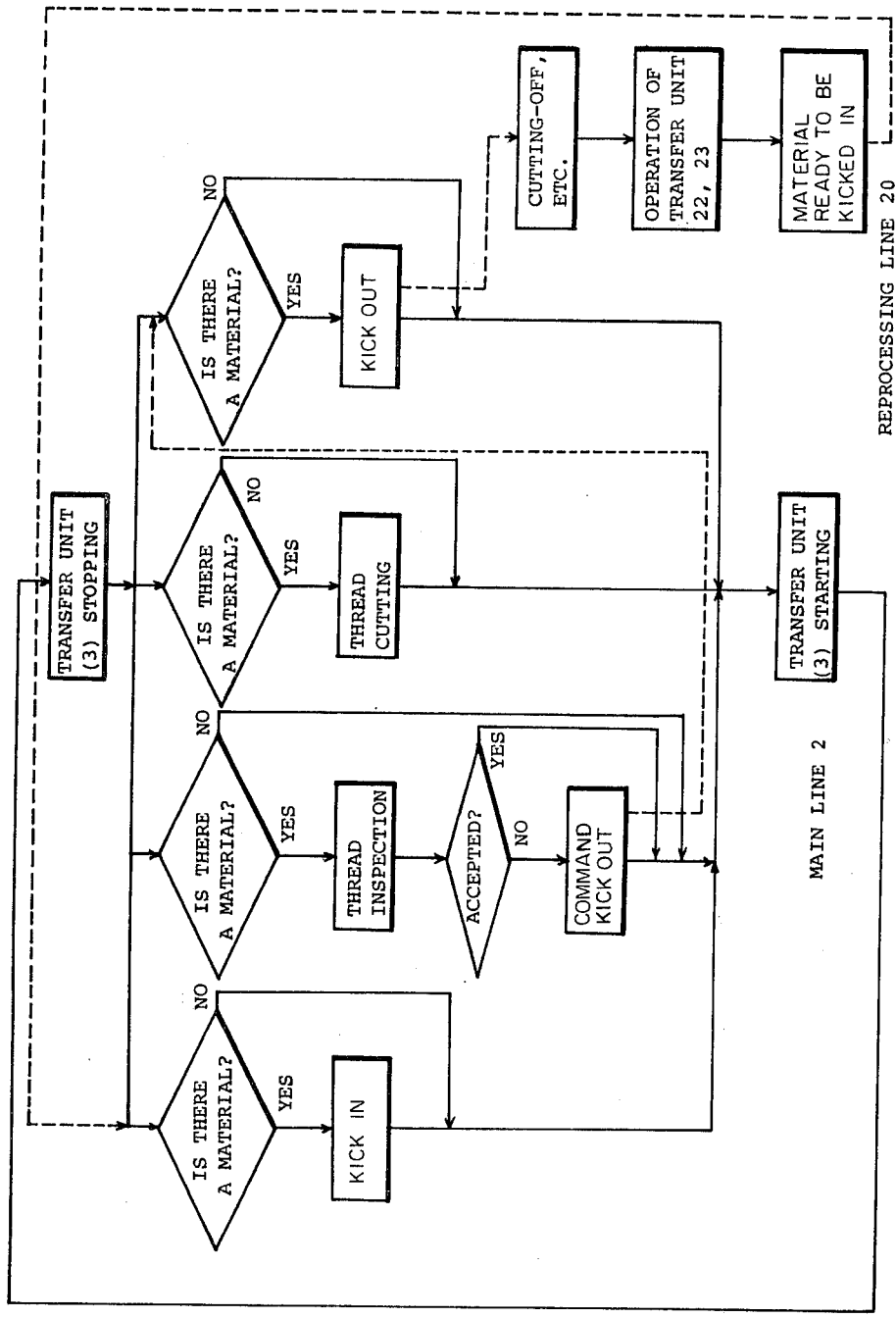
FIG. 2 is a flow chart showing the operations of the control system for the conditioning line according to the embodiment of FIG. 1.

The operations of the above-described main line 2 and the reprocessing line 20 are performed automatically by a control system (not shown in the drawings), and the automatic control system of a section 25 comprising the main line 2 and the reprocessing line 20 which are related to the invention and arranged parallel to each other to form a closed loop will now be described with reference to the flow chart shown in FIG. 2. For purposes of simplifying the description, it is assumed that a single steel pipe P is now being transferred near to the threading machine 9 of the main line 2. It is also assumed that the transfer unit 3 comprises a walking beam which repeatedly transfers and stops at predetermined intervals and the processing, inspection, etc., are performed during the stop periods of the walking beam.

(1) Initially, the transfer unit 3 is at rest.

(2) In this rest condition, whether any steel pipe p or a material to be threaded is present in the vicinity of the threading machine 9 is detected by a suitable sensor which is not shown.

(3) Since there is the material to be threaded, the threading machine 9 comes into operation and the threading operation is performed.

(4) When the threading operation is completed or when there is no material to be threaded, the transfer unit 3 comes into operation so that the line is advanced a predetermined distance and then the transfer unit 3 again comes to a rest.

(5) When the threaded steel pipe P comes near to the thread inspection unit 10, the presence of the steel pipe P is detected by a suitable sensor which is not shown.

(6) Since there is the material to be inspected, the inspection unit 10 inspects the material to determine whether it is acceptable or not.

(7) If the material is rejected, a kickout command is sent to the kickout unit 12.

(8) If there is no material to be inspected, if the material passes the inspection or if the kickout command is sent to the kickout unit 12, the transfer unit 3 again comes into operation and then comes to a rest again.

(9) If the material P to be inspected is not accepted, when the material P approaches the kickout unit 12, its presence is detected by a suitable sensor which is not shown.

(10) If there is the material to be kicked out, the material is transferred to the reprocessing line 20 by the kickout unit 12.

(11) The reprocessing unit 21 of the reprocessing line 20 performs the previously mentioned processing operations on the material and the reprocessed material is transferred to the kickin unit 24 by the high-speed transfer unit (22, 23).

(12) Then, with the transfer unit 3 at rest, the detection of the presence of the material to be kicked in is performed.

(13) Since there is the material to be kicked in, the material is transferred by the kickin unit 24 to the main line 2.

In this way, the main line 2 and the reprocessing line form a closed loop so that any rejected material is reprocessed on the reprocessing line 20 and then transferred back to the main line 2.

While, the above description has been made for purposes of easy understanding with reference to the case where there is the single steel pipe P on the main line 2, it should be apparent that actually a plurality of steel pipes P are successively traveling along the main line 2, and the decision as to the presence of material to be kicked in, the presence of material to be inspected, the presence of material to be processed and the presence of material to be kicked out and the performance of such operations as kickin, thread inspection, threading and kickout on the main line 2 as well as the reprocessing operations on the reprocessing line 20 are caused to proceed simultaneously.

In accordance with this embodiment, the time required for performing the thread cutting, inspection and fittings mounting operation on the main line 2 is about 5 seconds per steel pipe and the processing operations on the reprocessing line 20 will be completed in about 20 seconds. The time interval between the time a steel pipe rejected by the inspection is transferred to the reprocessing line 20 and the time the reprocessed steel pipe is transferred back to the main line 2, including the waiting period, is about 2 minutes on an average and thus there is no danger of causing any difficulty to the performance of the operations including the thread cutting et seq., after the return of the material to the main line 2.

While, in the embodiment described above, the processing units, the testing units, etc., are each provided on each side of the main line so as to process the ends of each steel pipe separately, it is possible to arrange the respective paired units in the opposite positions on the sides of the main line so as to process the ends of each steel pipe simultaneously.

Further, while the reprocessing line is arranged parallel to the thread cutting and inspection section of the main line, the present invention is not intended to be limited to this arrangement and it is only necessary to arrange the reprocessing unit parallel to any section of the main line such that the reprocessed steel pipe can be transferred back to the main line. Further, while, in the above-described embodiment, each of the kickoout units and the kickin unit comprises a large number of drum rolls arranged in a direction perpendicular to the main line, the invention is not limited to this construction and any other construction may be used. Still further, while the steel pipe transfer unit of the reprocessing line is shown by way of example as comprising a walking beam or the like, it may be comprised of the ordinary traveling carriage, transverse feed rolls or the like.

Figure 3:
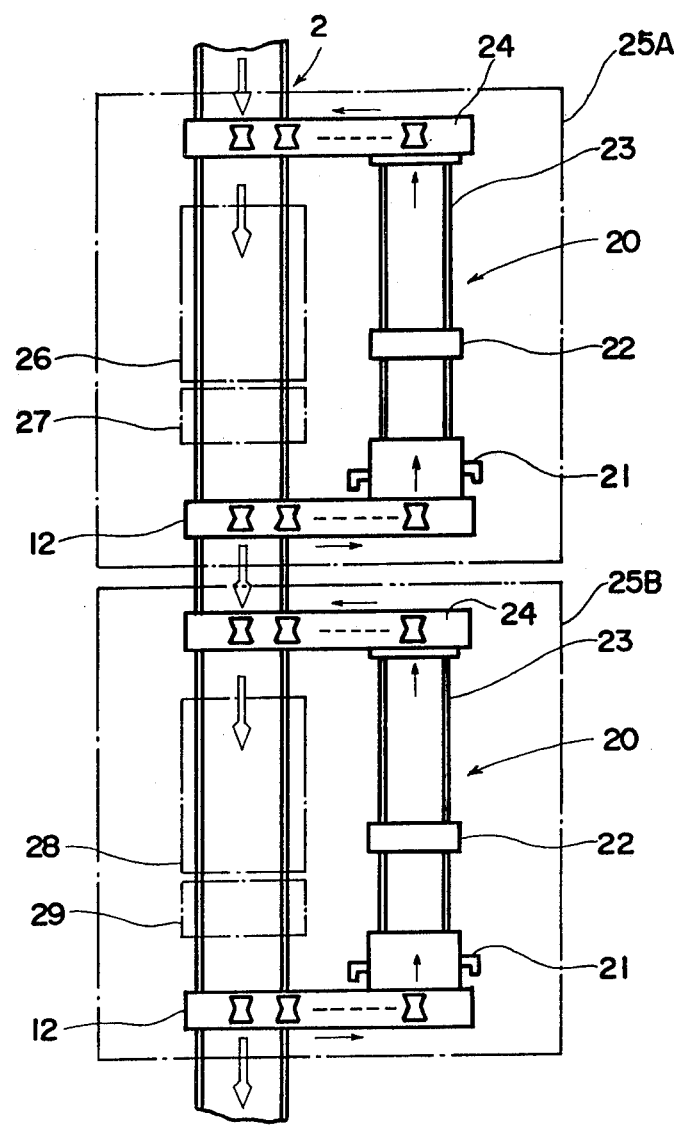
FIG. 3 is a plan view showing another embodiment of the arrangement of the conditioning line according to the present invention.

FIG. 3 is a plan view showing another embodiment of the arrangement of the conditioning line according to the invention and this embodiment differs from the embodiment of FIG. 1 in that two units of the closed loop 25 comprising the main line 2 and the reprocessing line 20 are arranged in line. The main line of a closed loop 25A comprises a first processing unit 26 and its testing unit 27. The main line of a closed loop 25B comprises a second processing unit 28 and its testing unit 29. In this way, each of the closed loops 25A and 25B repeatedly performs on the line the process of performing a certain processing operation on each of steel pipes, testing the result of the processing operation, transferring any rejected material to the reprocessing line 20 and processing again the reprocessed steel pipe on the main line. In this case, the first processing unit 26 may be comprised of end facing means and the second processing unit 28 may be comprised of thread cutting means. Of course, the present invention is not intended to be limited to this arrangement.

Figure 4:
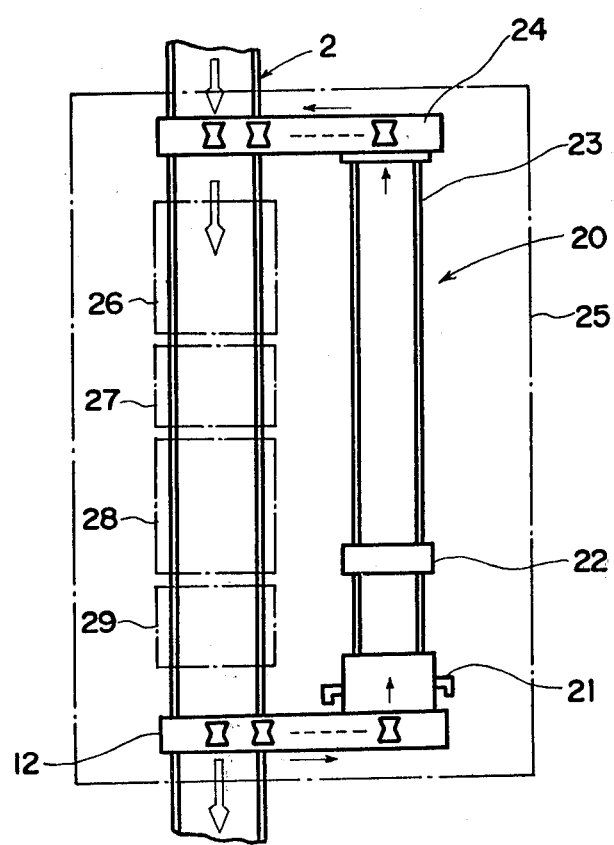
FIG. 4 is a plan view showing still another embodiing of the arrangement of the conditioning line according to the present invention.

FIG. 4 is a plan view showing still another embodiment of the arrangement of the conditioning line according to the invention and this embodiment differs from the embodiment of FIG. 3 in that the first processing unit 26 and its testing unit 27 as well as the second processing unit 28 and its testing unit 29 are arranged in the same closed loop. In this way, a plurality of pairs each comprising a processing unit and its associated testing unit are arranged in the main line of the closed loop. With this arrangement, if, for example, the first processing unit 26 is comprised of end facing means and the second processing unit 28 is comprised of thread cutting means, there is no need to effect the end facing operation by the reprocessing unit 21 of the single reprocessing line 20, thus simplifying the construction of the reprocessing unit 21.

The arrangement of the conditioning line according to the invention is not limited to those of the embodiments shown in FIGS. 1, 3 and 4 and the combination of main and reprocessing lines may of course be changed in accordance with the types of processing operations and the order in which they are performed.

It will thus be seen from the foregoing detailed description that in accordance with the present invention, a conditioning line for steel pipes comprises at least one main line and at least one reprocessing line which are arranged parallel to each other, whereby any steel pipe rejected as a result of the inspection on the main line is automatically transferred to the reprocessing line and the reprocessed steel pipe is automatically transferred back to the main line so as to be subjected to the required conditioning operations on the main line, thus remarkably improving the operating efficiency and reducing the equipment cost.

What is claimed is:

1. A steel pipe conditioning line comprising:
   at least one main line;
   at least one reprocessing line for rejected steel pipe;
   said main line and said reprocessing line being arranged parallel to each other;
   means to automatically transfer said rejected steel pipe from said main line to said reprocessing line;
   means for reprocessing said rejected steel pipe on said reprocessing line;
   means for automatically transferring said reprocessed steel pipe back to said main line;
   one or more closed loops comprised of at least one main line and at least one reprocessing line arranged in series; and
   said main line of each said closed loop includes at least one pair of thread cutting means and at least one thread inspecting means.

2. A steel pipe conditioning line as recited in claim 1, wherein:
   said reprocessing means of each said closed loop includes at least one reprocessing means and at least one high-speed transfer means.

3. A steel pipe conditioning line as recited in claim 7, wherein:
   said high-speed transfer means includes at least one high-speed movable carriage and at least one pair of rails.

4. A steel pipe conditioning line as recited in claim 1, wherein:
   said one or more of said closed loops consists of at least one kickout means and at least one kickin means connecting main line and said reprocessing line.

5. A steel pipe conditioning line comprising:
   at least one main line;
   at least one reprocessing line for rejected steel pipe;
   said main line and said reprocessing line being arranged parallel to each other,
   means to automatically transfer said rejected steel pipe from said main line to said reprocessing line;
   means for reprocessing said rejected steel pipe on said reprocessing line;
   means for automatically transferring said reprocessed steel pipe back to said main line;
   one or more closed loops comprised of at least one main line and at least one reprocessing line arranged in series; and
   said main line of each said closed loop including at least one pair of end facing means and at least one testing means.

6. A steel pipe conditioning line as recited in claim 5, wherein:
   said one or more of said closed loops consists of at least one kickout means and at least one kickin means connecting said main line and said reprocessing line.

7. A steel pipe conditioning line as recited in claim 5, wherein:
   said reprocessing means of each said closed loop includes at least one reprocessing means and at least one high-speed transfer means.

8. A steel pipe conditioning line as recited in claim 7, wherein:
   said high-speed transfer means includes at least one high-speed movable carriage and at least one pair of rails.

9. A steel pipe conditioning line, comprising:
   at least one main line;
   at least one reprocessing line for rejected steel pipe;
   said main line and said reprocessing line being arranged parallel to each other;
   means to automatically transfer said rejected steel pipe from said main line to said reprocessing line;
   means for reprocessing said rejected steel pipe on said reprocessing line;
   means for automatically transferring said reprocessed steel pipe back to said main line;
   one or more closed loops comprised of at least one main line and at least one reprocessing line arranged in series;
   said main line of said closed loop consists of at least one pair of processing means and at least one pair of testing means; and
   said main line of each of said closed loop includes at least one pair of thread cutting means and at least one thread inspecting means.

10. A steel pipe conditioning line, comprising:
    at least one main line;
    at least one reprocessing line for rejected steel pipe;
    said main line and said reprocessing line being arranged parallel to each other;
    means to automatically transfer said rejected steel pipe from said main line to said reprocessing line;
    means for reprocessing said rejected steel pipe on said reprocessing line;
    means for automatically transferring said reprocessed steel pipe back to said main line;
    one or more closed loops comprised of at least one main line and at least one reprocessing line arranged in series;
    said main line of said closed loop consists of at least one pair of processing means and at least one pair of testing means; and
    said main line of each said closed loop including at least one pair of end facing means and at least one testing means.

* * * * *